United States Patent
Harris et al.

(10) Patent No.: US 7,438,957 B2
(45) Date of Patent: Oct. 21, 2008

(54) POLY(ARYLETHERIMIDES) FOR NEGATIVE BIREFRINGENT FILMS FOR LCDS

(75) Inventors: Frank Harris, Akron, OH (US); Limin Sun, Copley, OH (US); Dong Zhang, Uniontown, OH (US); Stephen Z. D. Cheng, Richfield, OH (US)

(73) Assignee: Akon Polymer Systems, Akron, OH (US)

( * ) Notice: Subject to any disclaimer, the term of this patent is extended or adjusted under 35 U.S.C. 154(b) by 0 days.

(21) Appl. No.: 11/488,929

(22) Filed: Jul. 18, 2006

(65) Prior Publication Data

US 2007/0014938 A1     Jan. 18, 2007

Related U.S. Application Data

(60) Provisional application No. 60/700,169, filed on Jul. 18, 2005.

(51) Int. Cl.
*G02F 1/13363* (2006.01)

(52) U.S. Cl. .................. 428/1.3; 349/120; 528/353; 428/473.5

(58) Field of Classification Search ................ 428/1.27, 428/473.5, 1.3, 73.54; 528/172–173, 176, 528/185, 188, 220, 229, 350, 353; 349/120
See application file for complete search history.

(56) References Cited

U.S. PATENT DOCUMENTS

| | | | | |
|---|---|---|---|---|
| 4,952,666 A | * | 8/1990 | Landis | 528/222 |
| 5,061,781 A | * | 10/1991 | Leone-Bay et al. | 528/179 |
| 5,089,593 A | * | 2/1992 | Fjare et al. | 528/188 |
| 5,175,367 A | * | 12/1992 | Feiring | 564/309 |
| 5,202,412 A | * | 4/1993 | Auman et al. | 528/353 |
| 5,344,916 A | * | 9/1994 | Harris et al. | 528/353 |
| 5,480,964 A | | 1/1996 | Harris et al. | |
| 5,580,950 A | | 12/1996 | Harris et al. | |
| 5,675,039 A | * | 10/1997 | Stults et al. | 564/328 |
| 5,737,272 A | * | 4/1998 | Uchiyama et al. | 345/206 |
| 6,074,709 A | | 6/2000 | Ezzell et al. | |
| 6,853,424 B2 | | 2/2005 | Elman et al. | |

* cited by examiner

*Primary Examiner*—Keith D. Hendricks
*Assistant Examiner*—Sophie Hon
(74) *Attorney, Agent, or Firm*—Roetzel & Andress; Geroge W. Moxon, II

(57) ABSTRACT

A class of soluble poly(aryletherimides) (PAEIs) having flexible backbones, useful in the manufacture of polymeric optical films are disclosed. The poly(aryletherimides) are dissolved in organic solvents, such as ketones and ketone solvent mixtures and coated on variety of substrates such as triacetyl cellulose (TAC), to form clear thin-layer films which display negative birefringence. The thin films can serve as compensation layers in liquid crystal displays (LCDs), and can be combined with other types of optical films, such as polarizers, brightness enhancement films, or other compensation films, to from multi-layered films that are especially useful in the manufacture of LCDs.

9 Claims, No Drawings

POLY(ARYLETHERIMIDES) FOR NEGATIVE BIREFRINGENT FILMS FOR LCDS

RELATED APPLICATION DATA

This application claims priority to previously filed U.S. Provisional Application No. 60/700,169, filed on Jul. 18, 2005 entitled "Poly(aryletherimides) for Negative Birefringent Films for LCDs" and is hereby incorporated by reference in its entirety.

FIELD OF THE INVENTION

The invention relates to the manufacture of negative birefringent polymer films for use in compensation layers in liquid crystal displays (LCDs). More particularly, the invention relates to the manufacture and use of poly(aryletherimides) (PAEIs), which can be dissolved in variety of organic solvents and coated on a variety of polymer substrates. More particularly, the invention relates to the manufacture of PAEIs, which are prepared from dianhydrides containing flexible ether or perfluoroisopropylidene linkages and aromatic diamines containing flexible ether linkages. More particularly, the invention relates to the manufacture of PAEIs based on 2,2-bis(3,4-dicarboxyphenyl)-1,1,1,3,3,3-hexafluoropropane dianhydride (6FDA) and low-cost, fluorine-containing, aromatic ether diamines, which can be dissolved in selected solvents, such as ketone solvents and/or ketone solvent mixtures, and coated on preferred polymeric substrates, resulting in multi-layer polymeric optical films.

BACKGROUND OF THE INVENTION

Liquid crystals are useful for electronic displays because light traveling through a thin film of liquid crystal is affected by the birefringence of the film, which can be controlled by the application of a voltage across the film. Liquid crystal displays (LCDs) are desirable because the transmission or reflection of light from an external source, including ambient light, can be controlled with much less power than is required for luminescent materials used in other displays.

The following terms have the definitions as stated below.
1. Optical axis herein refers to the direction in which propagating light does not see birefringence.
2. Negative C-plate herein refers to the plate in which the optical axis is perpendicular to the plate.
3. In-plane refractive indices is defined by $n_\| = (n_x + n_y)/2$, where $n_x$ and $n_y$ are refractive indices in the direction of x and y, and x-y plane is parallel to the film plane.
4. In-plane birefringence is defined by $\Delta n_\| = (n_x - n_y)$.
5. In-plane phase retardation is defined by $R_\| = (n_x - n_y)d$, where d is a thickness of the film in a perpendicular to x-y plane z direction.
6. Out of-plane birefringence is defined by $\Delta n\bot = n_z - (n_x + n_y)/2$, where $n_z$ refractive index is in z direction.
7. Out of-plane retardation is defined by $R\bot = [n_z - (n_x + n_y)/2]d$.

LCDs now are commonly used in such applications as digital watches, calculators, cell phones, portable computers, televisions, and many other types of electronic equipment where the need exists for long life and small room operation with low power consumption. In particular, portable computer and large screen television LCDs benefit from their light-weight, small room occupation, low power consumption, and long life operation. It is expected that LCDs will replace cathode ray tubes (CRT) as monitors and television screens in the near future.

However, there is intrinsic viewing angle dependence in LCDs, which affects the quality of the display performance, such as contrast, coloration, and/or brightness. The primary factor limiting the quality of an LCDs' performance is the propensity of the light to leak through liquid crystal elements or cell, and this leakage's dependence on the direction from which the display is viewed. The best quality LCD picture is observed only within a narrow viewing angle range centered perpendicular to the display screen.

One of common methods to widen LCDs' viewing angles is to apply compensation films. Several LCD modes, including Twisted Nematic (TN), Super Twisted Nematic (STN), Vertical Alignment (VA), and Optically Compensated Bend (OCB), with or without an applied field, show positive C-plate symmetry, which can be compensated for by a compensation film with negative C-plate symmetry.

In a compensation film with negative C-plate symmetry, the out-of-plane refractive index, $n\bot$ or $n_z$, is less than the in-plane refractive index, $n_\| = (n_x + n_y)/2$, resulting in a negative out-of-plane birefringence, $\Delta n\bot = n_z - (n_x + n_y)/2 < 0$ and, hence, a negative out-of-plane retardation, $R\bot = [n_z - (n_x + n_y)/2]d < 0$. Negative birefringent films have been prepared by several different methods, such as, but not limited to precision stretching of polymer films, precisely controlled vapor deposition of thin ceramic layers, mixing of a swellable inorganic clay layer in a crosslinked polymer matrix, and solution casting or coating of thin polymer films. For large size negative birefringent films, the solution casting or coating method is preferred due to ease of processing and enhanced performance. A currently used technology involves stretching the film. The drawback to utilizing a stretching of these films involves the resultant stress relaxation which can distort the film, namely at a film/screen's corners. Using a poly (aryletherimide) would eliminate the need for stretching as not only is it nearly impossible to stretch, it is simply not necessary to achieve the results desired.

There are two major ways to apply a negative birefringent film prepared with the casting or coating method onto an LCD component which is an integral part of the LCD device, such as a polarizer. In the first, the negative birefringent film is solution cast on a solvent-passive carrier substrate, adhesive is then applied to the negative birefringent film surface. The combination is laminated on the LCD component and then the carrier substrate is removed (peeled off). In the second case, the negative birefringent film is made by coating the polymer solution directly on an LCD unit component such as a polarizer or a polarizer substrate. This procedure is preferred due to its simplicity and cost saving. However, this procedure requires that the polymer be soluble in select solvents. The solvent must dissolve the polymer which forms the negative birefringent film, but not dissolve or significantly swell the LCD component. The solvent must also be able to be used in large-scale, commercial coating operations. In Japanese patent 3735361, methylisobutyl ketone (MIBK) is shown to be the preferred solvent for solution coating cellulosic substrates since it best meets the above requirements. MIBK also does not dissolve triacetylcellulose (TAC), a commonly used substrate.

Prior art has shown that in order to form a negative birefringent film using solution casting or coating procedures, rigid structural units must be incorporated in the polymer backbone. This is thought to be due to such groups promoting the in-plane orientation of the polymer backbones during the solution casting or coating process. Since the incorporation of rigid groups in a polymer backbone also usually results in a reduction in solubility, special steps must be taken to achieve the desired balance between chain rigidity and solubility. For example, in U.S. Pat. Nos. 5,580,950, and 5,480,964 rigid-rod aromatic polymers, including polyesters, polyamides, and polyimides based on monomers with twisted 2,2'-disubstituted biphenyl structures are utilized. The balance between solubility and backbone rigidity is achieved due to the incorporation of the rigid twisted units in the polymer backbones. The twists in the rigid biphenyl unit hinder chain packing and, thus, enhance solubility.

In U.S. Pat. No. 6,074,709, pendent fluorene groups are incorporated in aromatic polyimide backbones through the polymerization of 9,9-bis(4-aminophenyl)fluorenes in order to attain solubility in useful solvents. However, in order to attain films with negative birefringences >0.01, very rigid dianhydrides, such as 3,3',4,4'-benzophenonetetracarboxylic acid dianhydride (BTDA), 3,3',4,4'-tetracarboxylicbiphenyl dianhydride (BPDA) or pyromellitic dianhydride (PMDA), must be used to prepare the polyimide. The use of flexible dianhydrides such as 4,4'-oxydiphthalic anhydride (ODPA) and 2,2-bis(3,4-dicarboxyphenyl)-1,1,1,3,3,3-hexafluoropropane dianhydride (6FDA) result in polyimides that form films with negative birefringences <0.01. These values can only be increased above 0.01 through copolymerization with rigid dianhydrides or rigid diamines such as p-phenylenediamine.

In U.S. Pat. No. 6,853,424 compensator layers are achieved by incorporation of rigid 1,4-dioxophenylene units

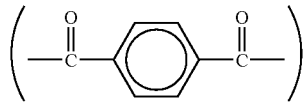

in the form of terephthalates. A particularly useful solubilizing monomer is 4,4'-(hexahydro-4,7-methanoindan-5-ylidene)bisphenol, which provides pendent bulky norbornene groups along the polymer backbone that hinder chain packing and enhance solubility, while still maintaining chain rigidity. Solubility can also be enhanced by copolymerization with monomers containing more flexible units such as 1,3-dioxophenylene groups or hexafluoroisopropylidene linkages. Although the use of the flexiblizing comonomer containing hexafluoroisopropylidene linkages (4,4-hexafluoroisopropylidene diphenol) provides suitable solubility, films of poly (terephthalates) prepared with this monomer have negative birefringences of <0.01. Other more rigid comonomers such as 4,4'-(hexahydro-4,7-melhanoindan-5-ylidene) bisphenol must also be used to attain a polyester chain rigid enough to form films with negative birefringences >0.01. Although more rigid than other polyesters, they are not as rigid as polyimides.

SUMMARY OF THE INVENTION

According to the present invention, there is provided a negative birefringence film prepared from a poly(aryletherimide), the film having a negative birefringence greater than 0.01, at a thickness of less than 15 μm, in which the poly (aryletherimide) is solution cast or coated onto a substrate.

Another embodiment involves this film wherein the film has one or more layers in which at least one layer is made from a poly(aryletherimide) soluble in ketone solvents, at least one layer is a polymer substrate film and the poly(aryletherimide) layer is cast or coated onto the substrate. A possible material for the substrate layer may be triacetylcellulose.

Another embodiment of this invention is to provide homopoly(aryletherimides) and copoly(aryletherimdes), that are soluble in ketone solvents and ketone solvent mixtures, which are capable of forming thin films by casting or coating procedures, which exhibit negative birefringence.

Another embodiment of this invention is to be able to coat or cast the soluble poly(aryletherimides) in ketone solvents and ketone solvent mixtures on another polymeric substrate film to form multi-layers polymeric films.

Another embodiment of this invention is to provide a negative birefringence film prepared from a poly(aryletherimide), the film having a negative birefringence greater than 0.01 and a thickness less than 15 μm, the poly(aryletherimide) combining a dianhydride and a diamine, and the poly(aryletherimide) is solution cast or coated onto the film.

Another embodiment of this invention is to prepare a negative birefringence film prepared from a poly(aryletherimide), the film having a negative birefringence greater than 0.01 and a thickness less than 15 μm, the poly(aryletherimide) combining a dianhydride chosen from the group consisting of: 2,2-bis(3,4-dicarboxyphenyl)-1,1,1,3,3,3-hexafluoropropane dianhydride (6FDA), bis(3,4-dicarboxyphenyl)ether dianhydride (ODPA), 4,4'-[4,4'-(p-phenyleneoxy)isopropylidene]-bis(phthalic anhydride) (Bis-A-DA), 4,4'-[4,4'-(p-phenyleneoxy)hexafluoroisopropylidene]-bis(phthalic anhydride) (Bis-AF-DA), 1,4-bis(3,4-dicarboxyphenyloxy) phenyl dianhydride, and 4,4'-bis(3,4-dicarboxyphenyloxy) biphenyl dianhydride (BPEDA), 1,5-bis(3,4-dicarboxyphenyloxy)naphthyl dianhydride, and a diamine chosen from the group consisting of: 4,4'-diaminophenyl ether, 2-trifluoromethyl-4,4'-diaminophenyl ether, 2,2'-bis(trifluoromethyl)-4, 4'-diaminophenyl ether, 2-trifluoromethyl-2'-methyl-4,4'-diaminophenyl ether, 1,4-bis(4-aminophenoxy)benzene, 4,4'-bis(4-aminophenoxy)biphenyl, 4,4'-bis(3-aminophenoxy) biphenyl, 4,4"-bis(4-aminophenoxy)terphenyl, 4,4'-bis(3-aminophenoxy)terphenyl, 2,2-bis[4-(4-aminophenoxy) phenyl]propane, 2,2-bis[4-(4-aminophenoxy)phenyl]1,1,1, 3,3,3-hexafluoropropane, 1,4-bis(4-amino-2-trifluoromethylphenoxy)benzene, 4,4'-bis(4-amino-2-trifluoromethylphenoxy)biphenyl, 4,4'-bis(4-amino-2-trifluoromethylphenoxy)-3,3',5,5'-tetramethylbiphenyl, 4,4'-bis(4-amino-2-trifluoromethylphenoxy)-3,3',5,5'-tetra(tert-butyl)biphenyl, 4,4'-bis(3-amino-trifluoromethylphenoxy) biphenyl, 4,4"-bis(4-amino-2-trifluoromethylphenoxy) terphenyl, 2,2-bis[4-(4-amino-2-trifluoromethylphenoxy)-phenyl]propane, 2,2-bis[4-(4-amino-2-trifluoromethylphenoxy)-phenyl]1,1,1,3,3,3-hexafluoropropane, and 4,4'-bis(4-amino-2-trifluoromethylphenoxy)benzene.

Another embodiment of this invention is to provide a liquid crystal display using a negative birefringence film prepared from a poly(aryletherimide) having a negative birefringence greater than 0.01, at a thickness of less than 15 μm, in which the poly(aryletherimide) is solution cast or coated onto the film.

Another embodiment of this invention is to provide a liquid crystal display using a polymeric film comprising one or more layers in which at least one layer is made from a poly (aryletherimide) soluble in ketone solvents, at least one layer is a polymer substrate film and the poly(aryletherimide) layer is cast or coated onto the film.

Another embodiment of this invention is to provide a liquid crystal display using a negative birefringence film prepared from a poly(aryletherimide), the film having a negative birefringence greater than 0.01 and a thickness less than 15 μm, the poly(aryletherimide) combining a dianhydride and a diamine, and the poly(aryletherimide) is solution cast or coated onto the film.

DETAILED DESCRIPTION OF THE INVENTION

Colorless poly(aryletherimide) films less than 15 µm thick with negative birefringences greater than 0.01 can be prepared by solution coating or casting procedures using the preferred solvents, ketones and ketone solvent mixtures. These films achieve their birefringence values as cast and need not be subjected to further stretching. These results are unexpected in that the poly(aryletherimides) are prepared from dianhydrides containing flexible perfluoroisopropylidene or ether linkages and diamines containing flexible ether linkages. Neither component need be rigid if this combination of monomers is used.

Representative and illustrative examples of the useful dianhydrides in the invention are:
2,2-bis(3,4-dicarboxyphenyl)-1,1,1,3,3,3-hexafluoropropane dianhydride (6FDA),
bis(3,4-dicarboxyphenyl)ether dianhydride (ODPA),
4,4'-[4,4'-(p-phenyleneoxy)isopropylidene]-bis(phthalic anhydride) (Bis-A-DA),
4,4'-[4,4'-(p-phenyleneoxy)hexafluoroisopropylidene]-bis(phthalic anhydride) (Bis-AF-DA),
1,4-bis(3,4-dicarboxyphenyloxy)phenyl dianhydride,
4,4'-bis(3,4-dicarboxyphenyloxy)biphenyl dianhydride (BPEDA),
1,5-bis(3,4-dicarboxyphenyloxy)naphthyl dianhydride.

Especially preferred dianhydrides would include:
2,2-bis(3,4-dicarboxyphenyl)-1,1,1,3,3,3-hexafluoropropane dianhydride (6FDA),
4,4'-[4,4'-(p-phenyleneoxy)-hexafluoroisopropylidene]-bis(phthalic anhydride) (Bis-AF-DA),
4,4'-bis(3,4-dicarboxyphenyloxy)biphenyl dianhydride (BPEDA).

The diamines that are especially useful for the invention include:
4,4'-diaminophenyl ether,
2-trifluoromethyl-4,4'-diaminophenyl ether,
2,2'-bis(trifluoromethyl)-4,4'-diaminophenyl ether,
2-trifluoromethyl-2'-methyl-4,4'-diaminophenyl ether,
1,4-bis(4-aminophenoxy)benzene,
4,4'-bis(4-aminophenoxy)biphenyl,
4,4'-bis(3-aminophenoxy)biphenyl,
4,4"-bis(4-aminophenoxy)terphenyl,
4,4'-bis(3-aminophenoxy)terphenyl,
2,2-bis[4-(4-aminophenoxy)phenyl]propane,
2,2-bis[4-(4-aminophenoxy)phenyl]1,1,1,3,3,3-hexafluoropropane,
1,4-bis(4-amino-2-trifluoromethylphenoxy)benzene,
4,4'-bis(4-amino-2-trifluoromethylphenoxy)biphenyl,
4,4'-bis(4-amino-2-trifluoromethylphenoxy)-3,3',5,5'-tetramethylbiphenyl,
4,4'-bis(4-amino-2-trifluoromethylphenoxy)-3,3',5,5'-tetra(tert-butyl)biphenyl,
4,4'-bis(3-amino-trifluoromethylphenoxy)biphenyl,
4,4"-bis(4-amino-2-trifluoromethylphenoxy)terphenyl,
2,2-bis[4-(4-amino-2-trifluoromethylphenoxy)-phenyl]propane,
2,2-bis[4-(4-amino-2-trifluoromethylphenoxy)-phenyl]1,1,1,3,3,3-hexafluoropropane.

Especially preferred diamines would include:
4,4'-bis(4-amino-2-trifluoromethylphenoxy)biphenyl,
4,4'-bis(4-amino-2-trifluoromethylphenoxy)benzene,
2-trifluoromethyl-4,4'-diaminophenyl ether,
2,2'-bis(trifluoromethyl)-4,4'-diaminophenyl ether,
2-trifluoromethyl-2'-methyl-4,4'-diaminophenyl ether,
2,2-bis[4-(4-amino-2-trifluoromethylphenoxy)phenyl]1,1,1,3,3,3-hexafluoropropane,
4,4"-bis(4-amino-2-trifluoromethylphenoxy)terphenyl.

One embodiment includes the combination which utilize at least one ether linkage and one perfluoromethyl in the diamine and at least two perfluoromethyl groups in the dianhydride.

The films of the present invention are soluble in cyclopentanone and MIBK. Solubility of the films in cyclopentanone is appropriate for many applications, a significant number of applications use MIBK solubility as well. As stated before, solubility in MIBK is the preferred solvent for solution coating on cellulosic substrates such as TAC.

In the films of the present invention, the PAEI film will include the trifluoromethyl (or perfluoromethyl) groups (CF$_3$) on both the diamine and dianhydirde. The presence of the trifluormethyl group(s) enhances the solubility of the film in MIBK.

The solvent mixture can be a mixture of solvents such as 95% MIBK and 5% ethyl acetate. Although, the percentages are not critical as long as it is predominantly 50% MIBK.

Mixtures of dianhydrides and diamines can be employed in the present invention. Mixtures of dianhydrides can be employed, preferably one of the dianhydrides has perfluoromethyl groups, while the other suitable dianhydrides that can be used include pyromellitic anhydride (I):

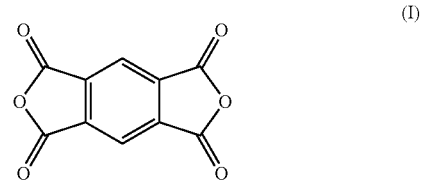

and aromatic tetracarboxylic acid dianhydrides of formula (II)

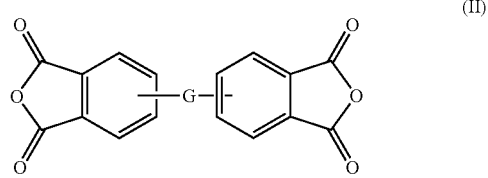

Mixtures of aromatic diamines can be used in combination preferably with the diamines of the invention including

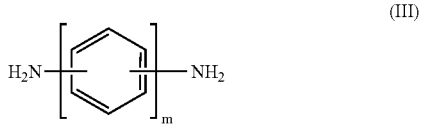

and/or aromatic diamines of formula (IV)

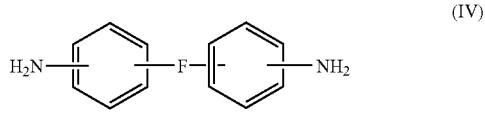

where G and F are independently selected from the representative and illustrative group consisting of a covalent bond, a $CH_2$ group, a $C(CH_3)_2$ group, a $C(CF_3)_2$ group, a $C(CX_3)_2$ group wherein X is a halogen, a CO group, a O atom, a S atom, a $SO2$ group, a $Si(CH_2CH_3)_2$ group or a $N(CH_3)$ group; and m is an integer from 1 to 3.

One embodiment involving a mixture includes a dianhydride mixture of 2,2-bis(3,4-dicarboxyphenyl)-1,1,1,3,3,3-hexafluoropropane dianhydride (6FDA) and 4,4' biphenyl dianhyride and the diamine is 4,4'-bis(4-amino-trifluoromethylphenoxy)biphenyl (6FOBDA). The mixture of 2,2-bis(3,4-dicarboxyphenyl)-1,1,1,3,3,3-hexafluoropropane dianhydride (6FDA) and 4,4' biphenyl dianhyride is a molar ration between 99 to 1 (99:1) and 40 to 60 (40:60). Another embodiment involves the molar ratio of the mixture of 2,2-bis(3,4-dicarboxyphenyl)-1,1,1,3,3,3-hexafluoropropane dianhydride (6FDA) and 4,4' biphenyl dianhyride being 80 to 20 (80:20).

Another embodiment involving a mixture includes a dianhydride mixture of 2,2-bis(3,4-dicarboxyphenyl)-1,1,1,3,3,3-hexafluoropropane dianhydride (6FDA) and 4,4 biphenyl dianhyride and the diamine is 2,2'-bis(trifluoromethyl)-4,4'-diaminophenyl ether (6FODA). The mixture of 2,2-bis(3,4-dicarboxyphenyl)-1,1,1,3,3,3-hexafluoropropane dianhydride (6FDA) and 4,4' biphenyl dianhyride is a molar ratio between 99 to 1 (99:1) and 40 to 60 (40:60). Another embodiment involves the molar ratio of the mixture of 2,2-bis(3,4-dicarboxyphenyl)-1,1,1,3,3,3-hexafluoropropane dianhydride (6FDA) and 4,4' biphenyl dianhyride being 80 to 20 (80:20).

EXAMPLES

The invention will be better understood by reference to the following illustrative and non-limiting representative examples, which show the preparation of polyimides and copolyimdes, which are soluble in organic solvents.

Preparation of Monomers

Example 1

This example illustrates the preparation of 2,2'-bis(trifluoromethyl)-4,4'-diaminophenyl ether (6FODA).

To 3000 ml, three necked, round bottom flask equipped with a mechanical stirrer, a thermometer, a nitrogen inlet and a condenser were added 2-chloro-5-nitrobenzotrifluoride (480.7 g, 2.132 mol), sodium carbonate (112.96 g, 0.122 mol), m-nitrobenzoic acid (1.77 g, 0.01 mol) and DMAc (700 ml). The mixture was heated at 150° C. for 48 hrs. After cooling to room temperature, the mixture was filtered to remove any solid. Most of starting material and DMAc was removed by distillation under reduced pressure. TLC showed a major product spot and a very minor starting material spot. Recrystallization from ethanol afforded pure platelet crystals (233 g, yield 55%). The mother liquid was concentrated and an additional 50 g product was obtained. TLC showed only one product spot. The total yield of pure product was 67% (233+50=283 g). M.P.: 94~95° C. Proton NMR (DMSO-$d_6$, δ, ppm): 8.582~8.522 (4H), 7.569~7.450 (2H).

To a 500 ml, three necked, flask equipped with a mechanical stirrer, a condenser and a gas outlet connected with a bubbler were added the dinitro-compound obtained above (20 g), ethanol (200 ml), Pd/C (0.3 g, Pd content: 10%) and hydrazine monohydrate (8.0 ml). The mixture was stirred at room temperature overnight. After the mixture was filtered, ethanol was removed under reduced pressure. Recrystallization from a mixture of toluene/hexanes afforded fine crystals: M.P.: 114~116° C. Proton NMR (DMSO-$d_6$, δ, ppm): 6.870~6.861 (2H), 6.750~6.712 (2H), 6.622~6.592 (2H), 5.278 (4H).

Example 2

This example illustrates the preparation of 2-trifluoromethyl-4,4'-diaminophenyl ether (3FODA).

To a 3000 ml, three necked, round bottom flask equipped with a mechanical stirrer, a condenser, a thermometer were added 4-nitrophenol (204 g, 1.467 mol), 2-chloro-5-nitrobenzotrifluoride (330.7 g, 1.467 mol) and DMAc (800 ml). After the mixture became homogeneous, potassium carbonate (205 g, 1.478 mol) was added. The mixture was heated at 100° C. for 20 hr. After cooling, the mixture was poured into 5 L of a methanol/water mixture (10/1, v/v). The precipitate that formed was collected by filtration, washed in water and filtered again. Recrystallization from a methanol/water mixture afforded crystals: 312 g, yield 64.8%. MP: 68~70° C. Proton NMR (DMSO-$d_6$, δ, ppm): 8.568~8.505, (2H), 8.349~8.293, (2H), 7.439~7.408, (3H).

To 1000 ml, three necked, round bottom flask equipped with a mechanical stirrer, a condenser, and a thermometer were added 2-trifluoromethy-4,4'-dinitrobiphenylether (88 g, 0.268 mol), ethanol (600 ml), Pd/C (5%, 1.0 g), and hydrazine monohydrate (60 ml). The mixture was heated at reflux for 20 hr. The reaction was completed at 100%. After cooling, the solution was filtered to remove any solid. Water was added to the filtrate whereupon a large amount of crystals precipitated. The crystals were further purified by sublimation. MP. 102~104° C. Proton NMR (DMSO-$d_6$, δ, ppm): 6.836~6.826 (1H), 6.699~6.693, (1H), 6.646~6.628, (1H), 6.606~6.598 (2H), 6.514~6.484 (2H), 5.218 (2H), 4.841 (2H).

Example 3

This example illustrates the preparation of 2-trifluoromethyl-2'-methyl-4,4'-diaminophenyl ether (3FHODA)

To 300 ml, three necked, round bottom flask equipped with a mechanical stirrer, a thermometer, and a condenser were added 2-chloro-5-nitrobenzotrifluoride (33.83 g, 0.15 mol), 2-methyl-4-nitrophenol (23 g, 0.15 mol), potassium carbonate (21 g, 0.15 mol) and DMF (100 ml). The mixture was heated to 100° C. overnight. After being cooled to room temperature, the mixture was filtered to remove any solid. Most of the solvent, DMF, was removed by distillation under reduced pressure. The residue was poured into water. The precipitate that formed was collected by filtration, and washed with water. Recrystallization from ethanol/water afforded fine crystals: yield~84%; MP=96~98° C. Proton NMR (DMSO-$d_6$, δ, in ppm) 8.548 (1H), 8.493~8.453, (1H), 8.349 (1H), 8.175~8.146 (1H), 7.347~7.317 (1H), 7.217~7.187 (1H), and 2.285 (3H).

To 500 ml, single necked, flat bottom flask equipped with a magnetic stirrer and a condenser (connected to a bubbler) were added the dinitro-compound (20 g), Pd/C (0.2 g, Pd 5%), ethanol (100 ml) and hydrazine monohydrate (8.0 ml). The mixture was stirred under room temperature overnight. The mixture was filtered, and the solvent was removed on a rotoevaporator. The diamine was purified by sublimation. MP=95~97° C. Proton NMR (DMSO-$d_6$, δ, in ppm): 6.861~6.852 (1H), 6.692~6.655 (1H), 6.537~6.509 (1H), 6.438~6.408 (2H), 6.379~6.342 (1H), 5.102 (2H), 4.825 (2H), 1.966 (3H).

Example 4

This example illustrates the preparation of 4,4'-bis(4-amino-trifluoromethylphenoxy)biphenyl (6FOQDA).

To a 300 ml, three necked, round bottom flask equipped with a thermometer, a mechanical stirrer and a condenser were added 1,4-dihydroxybenzene (11.62 g, 0.106 mol), 2-chloro-5-nitrobenzotrifluoride (50.0 g, 0.222 mol) and DMAc (100 ml), and dry $K_2CO_3$ (22.2 g, 0.16 mol). The reaction mixture then was heated at 130° C. for 10 hrs under nitrogen. Upon cooling, a large amount of precipitate formed, which was separated by filtration and washed with water, and dried. (46.03 g, 90.0%). MP: 205~207° C. Proton NMR (δ, ppm, DMSO-$d_6$): 8.526~8.517 (2H), 8.482~8.443 (2H), 7.388 (4H), 7.255~7.224 (2H). The compound was 4,4'-bis(4-nitro-2-trifluoromethylphenoxy)benzene.

To a 500 ml, three necked, round bottom flask equipped with a thermometer, a mechanical stirrer and a condenser were added 4,4'-bis(4-nitro-2-trifluoromethylphenoxy)biphenyl (20 g, 40.98 mmol), ethanol (200 ml), Pd/C (5% Pd, 0.4 g), and hydrazine mono-hydride (10 ml). The mixture was stirred and heated at reflux for 5 hrs and then cooled to room temperature. The mixture was filtered and the filtrate was added to water (~200 ml). The solid that precipitated was recrystallized from an ethanol/water mixture to afford colorless flake crystals (15.91 g, 90.7%). MP: 112~114° C. Proton NMR (δ, ppm, DMSO-$d_6$): 6.888~6.880 (2H), 6.883 (4H), 6.805~6.786 (4H), 5.375 (4H). The compound obtained was 4,4'-bis(4-amino-2-trifluoromethylphenoxy)benzene (6FOQDA).

Example 5

This example illustrates the preparation of 4,4'-bis(4-amino-trifluoromethylphenoxy)biphenyl (6FOBDA).

To a 500 ml, three necked, round bottom flask equipped with a thermometer, a mechanical stirrer and a condenser were added 4,4'-biphenyl (18.6 g, 0.1 mol), 2-chloro-5-nitrobenzotrifluoride (46.25 g, 0.205 mol) and DMSO (150 ml). After a homogeneous solution formed, dry $K_2CO_3$ (28.3 g, 0.205 mol) was added. The reaction mixture then was heated at 130° C. for 10 hrs. Upon cooling, a large amount of precipitate formed, which was separated by filtration and washed with methanol, and dried. Recrystallization from DMF/methanol mixture afforded pale needle crystals (34.35 g, 60.86%). MP: 215~216° C. Proton NMR (δ, ppm, DMSO-$d_6$): 8.530 (4H), 7.854 (4H), 7.346 (4H), 7.218 (2H). The compound obtained was 4,4'-bis(4-nitro-2-trifluoromethylphenoxy)biphenyl.

To a 500 ml, three necked, round bottom flask equipped with a thermometer, a mechanical stirrer and a condenser were added 4,4'-bis(4-nitro-2-trifluoromethylphenoxy)biphenyl (20 g, 0.0373 mol), ethanol (300 ml), Pd/C (5% Pd, 0.4 g), and hydrazine mono-hydride (10 ml). The mixture was stirred and heated at reflux overnight and then cooled to room temperature. The mixture was filtered and the filtrate was added to water (150 ml). The crude product was recrystallized from an ethanol/water mixture to afford colorless flake crystals (15.03 g, 80.0%). MP: 155~156° C. Proton NMR (δ, ppm, DMSO-$d_6$): 7.550 (4H), 6.912 (8H), 6.835 (2H), 5.425 (4H). The compound obtained was 4,4'-bis(4-amino-2-trifluoromethylphenoxy)biphenyl (6FOBDA).

Example 6

This example illustrates the preparation of 2,2-bis[4-(4-amino-2-trifluoromethylphenoxy)-phenyl]1,1,1,3,3,3-hexafluoropropane (12FOBDA).

To a 500 ml, three necked, round bottom flask equipped with a thermometer, a mechanical stirrer and a condenser were added Bisphenol AF (33.6 g, 0.1 mol), 2-chloro-5-nitrobenzotrifluoride (46.25 g, 0.205 mol) and DMSO (150 ml). After a homogeneous solution was formed, dry $K_2CO_3$ (28.3 g, 0.205 mol) was added. The reaction mixture then was heated at 100° C. for 3 hrs. After cooling to room temperature, the mixture was filtered, and the filtrate was poured into water (1000 ml). The precipitate that formed was collected by filtration and washed with water, and dried. Recrystallization from DMF/methanol afforded pale fine crystals (43.84 g, 61.37%). MP: 174~175° C. Proton NMR (δ, ppm, DMSO-$d_6$): 8.531 (4H), 7.517 (4H), 7.371 (6H). The compound obtained was 2,2-bis[4-(4-nitro-2-trifluoromethylphenoxy)-phenyl]1,1,1,3,3,3-hexafluoropropane.

To a 1000 ml, three necked, round bottom flask equipped with a thermometer, a mechanical stirrer and a condenser were added 2,2-bis[4-(4-nitro-2-trifluoromethylphenoxy)phenyl]-hexafluoropropane (29.23 g, 0.041 mol), and ethyl acetate (200 ml). After a homogeneous solution formed, ethanol (200 ml), and ammonium formate (28 g), Pd/C (2 g, Pd 5%) were added. The mixture was stirred at room temperature overnight and then filtered. The solvents were removed from the filtrate on a rotoevaporator. The residual solid was dried under reduced pressure to afford 20.83 g (77.63%) of a white solid. MP: 65~66° C. Proton NMR (δ, ppm, DMSO-$d_6$): 7.280 (4H), 6.964 (8H), 6.835 (2H), 5.486 (4H). The compound obtained was 2,2-bis[4-(4-amino-2-trifluoromethylphenoxy)-phenyl]1,1,1,3,3,3-hexafluoropropane (12FOBDA).

One-Step Procedure for Homopolyimide

Example 7

This example illustrates the general procedure to prepare a homopolyimide of a dianhydride and a diamine.

1.00 millimoles of dianhydride was added to a stirred solution of 1.00 millimoles of a diamine in 10 milliliters of m-cresol under nitrogen at ambient temperature. After the solution was stirred for 6 hours, 0.05 grams of isoquinoline was added. The mixture was heated to 200° C. and maintained at that temperature for 12 hours. During this time, the water of imidization was allowed to distill from the reaction mixture. After the solution was allowed to cool to ambient temperature, it was added slowly to 500 milliliters of stirred methanol. The polymer that precipitated was collected by filtration, washed with ethanol and dried under reduced pressure at 150° C. for 24 hours.

One-Step Procedure for Copolyimide

Example 8

This example illustrates the general procedure to prepare a copolyimide from a mixture of dianhydrides and one diamine.

1.00 millimoles of a mixture of dianhydrides was added to a stirred solution of 1.00 millimoles of a diamine in 10 milliliters of m-cresol under nitrogen at ambient temperature. After the solution was stirred for 6 hours, 0.05 grams of isoquinoline was added. The mixture was heated to 200° C. and maintained at that temperature for 12 hours. During this time, the water of imidization was allowed to distill from the reaction mixture. After the solution was allowed to cool to ambient temperature, it was added slowly to 500 milliliters of stirred methanol. The polymer that precipitated was collected by filtration, washed with ethanol and dried under reduced pressure at 150° C. for 24 hours.

Example 9

This example illustrates the general procedure to prepare a copolyimide of one dianhydride and multi-components diamines.

1.00 millimoles of a dianhydride was added to a stirred solution of 1.00 millimoles of multi component diamine in 10 milliliters of m-cresol under nitrogen at ambient temperature. After the solution was stirred for 6 hours, 0.05 grams of isoquinoline was added, and the mixture was heat to 200° C. and maintaining at that temperature for 12 hours. During this time, the water of imidization was allowed to distill from the reaction mixture. After the solution was allowed to cool to ambient temperature, it was added slowly to 500 milliliters of stirred methanol. The polymer that precipitated was collected by filtration, washed with ethanol and dried under reduced pressure at 150° C. for 24 hours.

Solubility of Polyimides and Birefringence of the Films

Polyimide films displaying negative birefringence were prepared by the following procedure: the polyimide was dissolved in cyclopentanone or MIBK to a solids content between 4~5%. After filtration, the solution was poured on a glass substrate. The solvent was allowed to evaporate at ambient temperature. The glass substrate containing the film was dried at 100° C. under reduced pressure. The polyimide film was removed from the glass by dipping the substrate glass in water. The birefringence of the polyimide film was determined on a Metricon Prism Coupler 2010/M. The birefringences of typical examples are given in Tables 1, 2 and 3.

Film Coating

A MIBK solution of the poly(aryletherimide) was rod-coated on a glass plate or on a triacetylcellulose (TAC) film. In the case of a glass plate, a solution containing 3 to 5 wt % of the poly(aryletherimide) was used, while in the case of a TAC film, a solution containing 8 to 20 wt % of the poly(aryletherimide) was used.

TABLE 1

SOLUBILITY OF 6FDA-BASED POLY(ARYLETHERIMIDES) IN CYCLOPENTANONE (CPN) AND METHYLISOBUTYL KETONE (MIBK)

| No. | Dianhydride | Diamine |
|-----|-------------|---------|
| 1 | 6FDA dianhydride | $H_2N$—⌬—O—⌬—$NH_2$ |
| 2 | 6FDA dianhydride | $H_2N$—⌬—O—⌬($CF_3$)—$NH_2$ |
| 3 | 6FDA dianhydride | $H_2N$—⌬($CH_3$)—O—⌬($CF_3$)—$NH_2$ |
| 4 | 6FDA dianhydride | $H_2N$—⌬($CF_3$)—O—⌬($CF_3$)—$NH_2$ |

TABLE 1-continued

| No. | CPN[a] solubility | MIBK[b] solubility | Δn[c] | Δn[d] |
|---|---|---|---|---|
| 1 | √[e] | X[f] | −0.0230 | |
| 2 | √ | √ | −0.0256 | −0.0299 |
| 3 | √ | √ | −0.0169 | −0.0310 |
| 4 | √ | √ | −0.0293 | −0.0295 |
| 5 | √ | √ | −0.0195 | −0.0307 |
| 6 | √ | X | −0.0397 | |
| 7 | √ | √ | −0.0306 | −0.0368 |
| 8 | √ | √ | −0.0137 | |

[a]Cyclopentanone.
[b]Methylisobutyl ketone.
[c]Negative birefringence of 15-20 μm thick film on a glass substrate.
[d]Negative birefringence of 1-5 μm thick film on a triacetylcellulose (TAC) film.
[e]Soluble.
[f]Insoluble.

TABLE 2

SOLUBILITY OF POLY(ARYLETHERIMIDES) BASED ON SEMI-FLUORINATED DIAMINES IN CYCLOPENTANONE (CPN) AND METHYLISOBUTYL KETONE (MIBK)

| No. | Dianhydride | Diamine |
|---|---|---|
| 9 | | |

TABLE 2-continued

| No. | CPN[a] solubility | MIBK[b] solubility | Δn[c] | Δn[d] |
|---|---|---|---|---|
| 9 | √[e] | X[f] | −0.0289 | |
| 10 | √ | X | −0.0388 | |
| 11 | √ | X | −0.0373 | |
| 12 | √ | X | −0.0383 | |
| 13 | √ | X | −0.0296 | |

[a]Cyclopentanone.
[b]Methylisobutyl ketone.
[c]Negative birefringence of 15-20 μm thick film on a glass substrate.
[d]Negative birefringence of 1-5 μm thick film on a triacetylcellulose (TAC) film.
[e]Soluble.
[f]Insoluble.

TABLE 3

SOLUBILITY OF 6FDA-BASED POLY(ARYLETHERIMIDE) COPOLYMERS IN CYCLOPENTANONE (CPN) AND METHYLISOBUTYL KETONE (MIBK)

| No. | Dianhydride | Diamine |
|---|---|---|
| 14 | (20% mol) and (80% mol) | |

TABLE 3-continued
| | | |
|---|---|---|
| 15 | 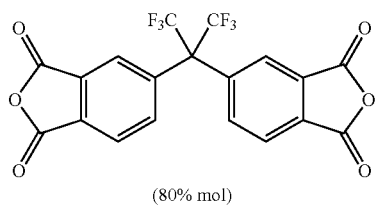<br>(80% mol)<br>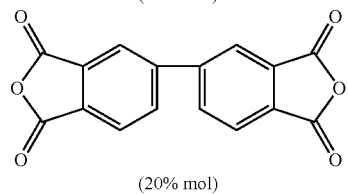<br>(20% mol) | 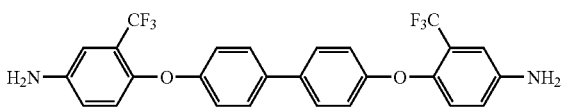 |
| 16 | 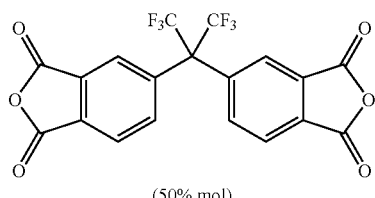<br>(50% mol)<br>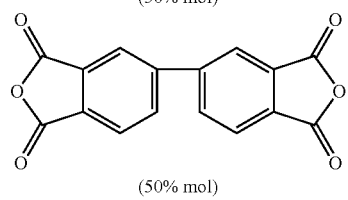<br>(50% mol) | 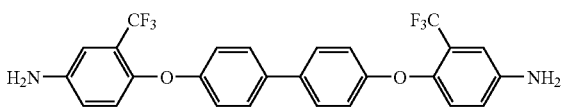 |
| 17 | 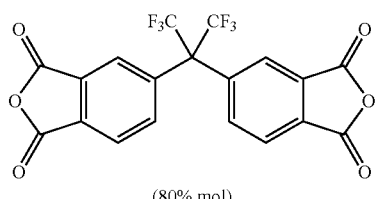<br>(80% mol)<br>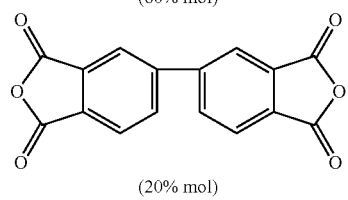<br>(20% mol) | 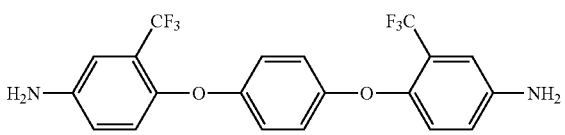 |
| 18 | 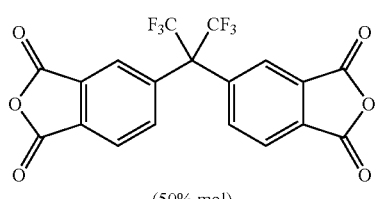<br>(50% mol)<br>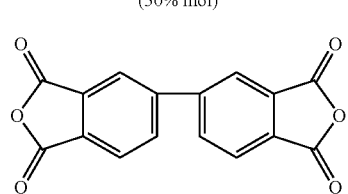<br>(50% mol) | 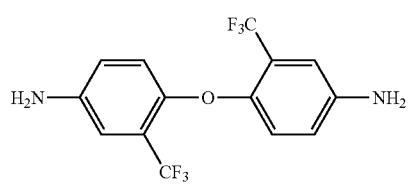 |

TABLE 3-continued

| | dianhydride | diamine |
|---|---|---|
| 19 | [6FDA structure] (50% mol) <br> [BPADA-type structure with biphenyl ether] (50% mol) | [bis(4-amino-2-trifluoromethylphenoxy)biphenyl] |
| 20 | [6FDA structure] | [bis(4-amino-2-trifluoromethylphenoxy)biphenyl] (50% mol) <br> [p-phenylenediamine] (50% mol) |
| 21 | [6FDA structure] | [bis(4-amino-2-trifluoromethylphenoxy)biphenyl] (50% mol) <br> [benzidine] (50% mol) |
| 22 | [6FDA structure] | [bis(4-amino-2-trifluoromethylphenoxy)biphenyl] (70% mol) <br> [p-terphenyl diamine] (30% mol) |
| 23 | [6FDA structure] | [bis(4-amino-2-trifluoromethylphenoxy)biphenyl] (50% mol) <br> [4,4'-diaminobenzanilide] (50% mol) |

TABLE 3-continued

| No. | CPN[a] solubility | MIBK[b] solubility | Δn[c] | Δn[d] |
|---|---|---|---|---|
| 14 | √[e] | √ | −0.0293 | |
| 15 | √ | √ | −0.0315 | −0.0514 |
| 16 | √ | X[f] | −0.0392 | |
| 17 | √ | √ | −0.0213 | −0.0319 |
| 18 | √ | √ | −0.0404 | −0.0538 |
| 19 | √ | √ | −0.0331 | |
| 20 | √ | √ | −0.0336 | |
| 21 | √ | X | −0.0397 | |
| 22 | √ | X | −0.0305 | |
| 23 | √ | X | −0.0389 | |

[a]Cyclopentanone.
[b]Methylisobutyl ketone.
[c]Negative birefringence of 15-20 μm thick film on a glass substrate.
[d]Negative birefringence of 1-5 μm thick film on a triacetylcellulose (TAC) film.
[e]Soluble.
[f]Insoluble.

The invention claimed is:

1. A negative birefringence film prepared from a poly(aryletherimide), wherein the poly(aryletherimide) is a reaction product of a dianhydride and a diamine, the dianhydide is a mixture of 2,2-bis(3,4-dicarboxyphenyl)-1,1,1,3,3,3-hexafluoropropane dianhydride (6FDA) and 3,3',4,4'-tetracarboxylicbiphenyl dianhydride, the molar ratio of the mixture is between 99 to 1 (99:1) and 40 to 60 (40:60), the diamine is selected from the group consisting of:

2,2'-bis(trifluoromethyl)-4,4'-diaminophenyl ether (6FODA), 4,4'-bis(4-amino-2-trifluoromethylphenoxy) benzene (6FOQDA), and 4,4'-bis(4-amino-trifluoromethylphenoxy)biphenyl (6FOBDA), and the film has a negative birefringence greater than 0.01, at a thickness of less than 15 μm, when the poly(aryletherimide) is solution cast or coated onto a substrate.

2. The film of claim 1 wherein the film has one or more layers in which at least one layer is made from a poly(aryletherimide) soluble in ketone solvents, at least one layer is a polymer substrate film and the poly(aryletherimide) layer is solution cast or coated onto the substrate.

3. The film of claim 2 wherein at least one of the layers is a substrate layer made from triacetylcellulose.

4. The film of claim 1 wherein the diamine is 4,4'-bis(4-amino-trifluoromethylphenoxy) biphenyl (6FOBDA).

5. The film of claim 1 wherein the diamine is 2,2'-bis(trifluoromethyl)-4,4'-diaminophenyl ether (6FODA).

6. The film of claim 1 where the molar ratio of the mixture of 2,2-bis(3,4-dicarboxyphenyl)-1,1,1,3,3,3-hexafluoropropane dianhydride (6FDA) and 3,3',4, 4'-tetracarboxylicbiphenyl dianhydride is 80 to 20 (80:20).

7. A liquid crystal display having multiple layers wherein one of the layers is the negative birefringence film of claim 1.

8. The film of claim 1 wherein the poly(aryletherimide) is soluble in ketone solvents or ketone solvent mixtures.

9. The film of claim 1 wherein the diamine is 4,4'-bis(4-amino-2- trifluoromethylphenoxy) benzene (6FOQDA).

* * * * *